United States Patent
Masa

(10) Patent No.: US 9,035,232 B2
(45) Date of Patent: May 19, 2015

(54) METHOD FOR WORKING OUT THE ECCENTRICITY AND THE ANGULAR POSITION OF A ROTATING ELEMENT AND DEVICE FOR CARRYING OUT SUCH A METHOD

(75) Inventor: Peter Masa, Onnens (CH)

(73) Assignee: CSEM CENTRE SUISSE D'ELECTRONIQUE ET DE MICROTECHNIQUE SA-RECHERCHE ET DEVELOPPMENT, Neuchatel (CH)

(*) Notice: Subject to any disclaimer, the term of this patent is extended or adjusted under 35 U.S.C. 154(b) by 279 days.

(21) Appl. No.: 13/547,554

(22) Filed: Jul. 12, 2012

(65) Prior Publication Data

US 2013/0015337 A1 Jan. 17, 2013

(30) Foreign Application Priority Data

Jul. 13, 2011 (CH) .................................... 1177/11
Dec. 2, 2011 (EP) ...................................... 11191676

(51) Int. Cl.
G01D 5/34 (2006.01)
G01D 5/347 (2006.01)

(52) U.S. Cl.
CPC ................. G01D 5/34792 (2013.01)

(58) Field of Classification Search
CPC .................................................. G01D 5/34792
USPC ......................................... 250/231.13–231.18
See application file for complete search history.

(56) References Cited

FOREIGN PATENT DOCUMENTS

| EP | 2 169 357 A1 | 3/2010 |
| EP | 2251641 A1 | 11/2010 |
| EP | 2251647 A1 | 11/2010 |
| EP | 2275782 A1 * | 1/2011 |
| JP | 2007064949 A | 3/2007 |
| WO | 2010112082 A1 | 10/2010 |

OTHER PUBLICATIONS

European Search Report, dated Sep. 16, 2013, from corresponding EP application.

* cited by examiner

*Primary Examiner* — Thanh Luu
(74) *Attorney, Agent, or Firm* — Young & Thompson

(57) ABSTRACT

A method for working out the angular position of a rotating element, by using at least one fixed light source emitting a light beam in the direction of a fixed sensor, arranging the light source with respect to the rotating element and sensor to induce an interaction between the beam and sensor, and providing a value of the angular position dependent of the sensor's output signal. The method including:
  arranging on the path of the beam a code-disc presenting a two-dimensional pattern of transparent and opaque areas and an absolute code integral with the rotating element,
  using the image casted by the code-disc on the sensor for determining the eccentricity of the code-disc in dependence of the angular position of the rotating element,
  using the eccentricity for compensating the value of the computed angular position, and
  computing a corrected angular position of the rotating element.

19 Claims, 2 Drawing Sheets

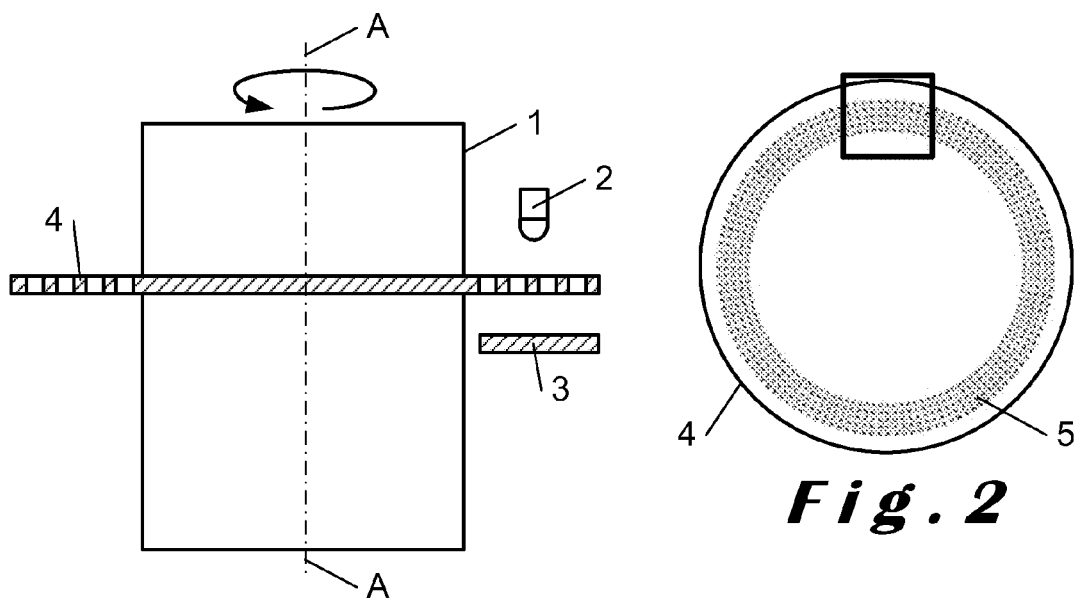
*Fig.1*
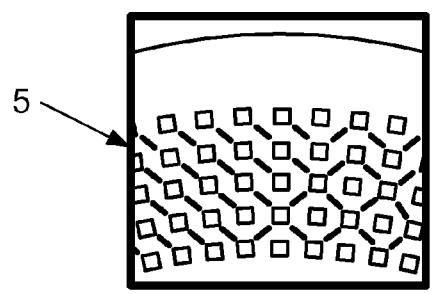
*Fig.2*
*Fig.3*
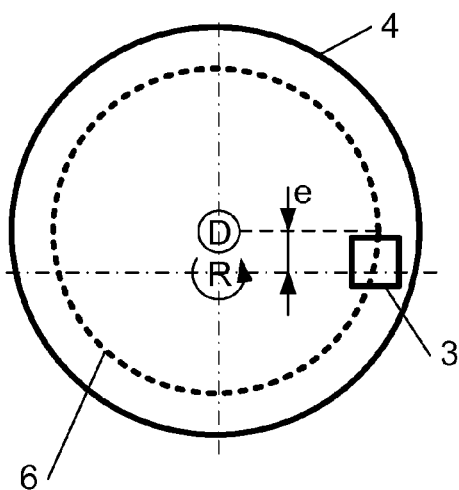
*Fig.4*
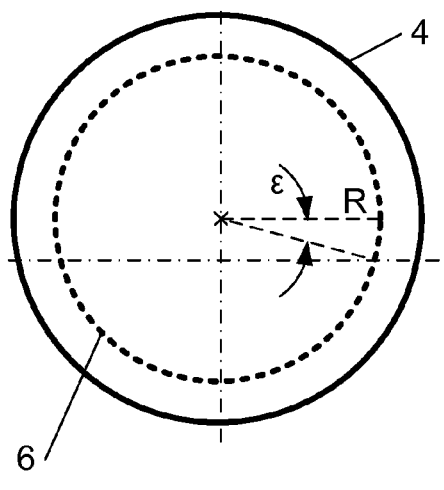
*Fig.5*

METHOD FOR WORKING OUT THE ECCENTRICITY AND THE ANGULAR POSITION OF A ROTATING ELEMENT AND DEVICE FOR CARRYING OUT SUCH A METHOD

TECHNICAL FIELD

The present invention relates to the technical field of the determination of the angular and radial positions of a rotational part or element, for instance a shaft, with respect to a fixed frame or structure. Devices such as optical encoders, such as end-of-shaft encoders or hollow shaft encoders, which allow such a determination, are already known for instance in the field of electric actuators or motors.

The present invention concerns more particularly a method for determining reliable angular and radial positions of a rotating element, such as a hollow shaft, with a very high accuracy.

The present invention concerns also device for carrying out the above mentioned method.

BACKGROUND OF THE INVENTION

Two types of rotary encoders are known. The first type concerns end-of-shaft encoders which are placed at the end of an axis and the second type concerns hollow-shaft encoders which are placed anywhere along the axis of the shaft.

These encoders suffer all of a main drawback which lies in the fact that the radial position of the said axis cannot be determined with high accuracy. The eccentricity of an axis can so not be determined with accuracy. This results also in a limitation of the precision of the determined angular position.

It is known to use a technique for decreasing the eccentricity, which is based on a visual inspection by humans using a microscope and moving a reference code-disc manually. In the final position, the code-disc is fixed by glue. This is a very expensive procedure which increases the costs of accurate encoders. Furthermore, the theoretical resolution limit of an optical microscope is not high enough to reduce the eccentricity sufficiently.

Other expensive techniques, using multiple sensor arrangements are also known. In such techniques, three tangential measurements are necessary for obtaining eccentricity compensation. The prices and dimensions of such encoders are very high because they need three sensors and to combine their output. In addition, multiple sensors lead to higher power consumption, and higher heat dissipation.

SUMMARY OF THE INVENTION

Consequently, an object of the present invention is to propose a new method for determining the angular and radial positions of a rotating element which does not present the aforementioned drawbacks.

The object of the present invention is therefore to propose a new method for determining the angular and radial position of a rotating element which is reliable and very precise.

Another object of the present invention is to propose a novel device for determining the angular and radial position of a rotating element which is reliable and very precise although presenting large positioning tolerances of its constitutive parts during their mounting.

Another object of the present invention is to propose a novel device for determining the angular and radial position of a rotating element which is of minimal dimensions.

Another object of the present invention is to propose a novel device for determining the angular and radial position of a rotating element which is unexpensive especially in its manufacturing, mounting and operating costs.

The objects of the invention are achieved with the help of a method for working out at least the eccentricity of a rotating element which is mounted in a fixed frame, consisting in using at least one fixed light source emitting a light beam in the direction of a fixed sensor, arranging the light source with respect to the rotating element and with respect to the sensor in a way so as to induce an interaction between the light beam and the sensor, which depends on the angular position and the radial position of the rotating element and using computing and processing means for providing a value of the radial position dependence on the output signal of the sensor. Moreover, this method consists in:

a) arranging on the path of the light beam a code-disc which comprises a two dimensional regular pattern interlaced with an absolute code and which is integral in rotation with the rotating element, and b) using an image casted by the code-disc on the sensor for determining the eccentricity of the code-disc in dependence on the angular position of the rotating element.

In the present application, the term "consist" should be interpreted in a non limiting way and with the same meaning as the term "comprise".

The objects of the invention are also achieved with the help of a method for determining at least the angular position of a rotating element which is mounted in a fixed frame, consisting in using at least one fixed light source emitting a light beam in the direction of a fixed sensor, arranging the light source with respect to the rotating element and of the sensor in a way so as to induce an interaction between the light beam and the sensor, which depends on the angular and the radial position of the rotating element and using computing and processing means for providing a value of the angular position dependent of the output signal of the sensor. This method moreover consists in:

a) arranging on the path of the light beam a code-disc which presents a two dimensional regular pattern interlaced with an absolute code interlacing the regular pattern and which is integral in rotation with the rotating element, b) using an image casted by the code-disc on the sensor for determining the eccentricity of the code-disc in dependence on the computed angular position of the rotating element, c) using a determined eccentricity value for compensating the value of the computed angular position, and d) computing and providing a corrected angular position of the rotating element.

In an implementation in accordance with the invention, the method consists in determining the eccentricity by processing for each angular position a radial spacing between a computed radial position of the image of the code-disc and a detected radial position of the image or shadow of the code-disc on the sensor, the computed radial position of the image being the mean value over every angle of the detected radial positions of the image of the code-disc.

In an example of carrying out the method in accordance with the invention, it consists in using a code-disc which surrounds the rotating element and which presents transparent and opaque areas defining the two dimensional regular pattern and an absolute code, on an annular area of the said code-disc.

In an example of carrying out the method in accordance with the invention, it consists in providing the angular and radial position of a hollow shaft.

In an example of carrying out the method in accordance with the invention, it consists in providing eccentricity values defining the quality of the roundness of the rotating element.

The objects given to the invention are also achieved with the help of a device for carrying out the method proposed above and providing at least the angular position of a rotating element which is able to rotate in a fixed frame. Such a device comprises a fixed light source emitting a light beam, optical transmission means localized on the path of the light beam and influencing the light beam in dependence on the angular position and the radial position of the rotating element, a fixed sensor which is hit by the influenced light beam and processing and computing means for providing the angular position of the rotating element by using the output signal of the sensor, the optical transmission means comprising an annular code-disc surrounding the rotating element and integral in rotation with the rotating element, the code-disc comprising a two dimensional regular pattern positioned regularly along the radial and along the tangential direction of the code-disc so that the regular pattern extends along an annular area of said code-disc, the optical transmission means comprising also an absolute code interlaced with said two dimensional regular pattern, and the processing and computing means being designed to determine by using the detected image of the code-disc cast on the sensor, the eccentricity of the code-disc and to compute a corrected angular position of the rotating element with respect to the said eccentricity.

In this invention, the term "image" should be understood in its broadest meaning which encompasses also a shadow of the code-disc casted on the sensor.

The terms "integral in rotation" is to be understood as "connected in rotation" or "interdependent in rotation".

In an embodiment of the device in accordance with the invention, the regular pattern and the absolute code are built up on the code-disc with perforations or holes.

In an embodiment of the device in accordance with the invention, the regular pattern and the absolute code are built up on the code-disc with reflecting areas.

In an embodiment of the device in accordance with the invention, the sensor is an imaging device comprising a pixel array.

In an embodiment of the device in accordance with the invention, the processing and computing means are integrated in the sensor.

In an embodiment of the device in accordance with the invention, the light source is designed for emitting a beam of collimated light with parallel light rays.

In an embodiment of the device in accordance with the invention, the rotating element is a hollow shaft.

In an embodiment of the device in accordance with the invention, the rotating element is a ball-bearing or a rotating part supported by ball-bearings.

An advantage of the device in accordance with the invention lies in its very large versatility. The device in accordance with the invention fits well with many different applications such as rotary encoders for end-of-shaft arrangements, linear encoders, two-dimensional and three-dimensional position encoders.

Another advantage of the device in accordance with the invention lies in the fact that its constitutive parts can be mounted with very large mounting tolerances. Indeed, the code-disc comprising a combination of a two dimensional regular pattern interlaced with an absolute code, provides radial and tangential shift invariance. The device and the method in accordance with the invention provide also an automated compensation of the code-disc position.

Another advantage of the device in accordance with the invention lies in that the device can comprise only one small sized sensor. The photosensitive area of the sensor has for instance a surface of only 1 mm$^2$ and can provide a high resolution and measurement accuracy.

Another advantage of the method in accordance with the invention lies in that it takes into account the true rotation axis of the rotating element. The method does not rely on the position of a central axis of the rotating element. This central axis which can be off centered with respect to the rotation axis has therefore not to be localized.

An advantage of the method and of the device in accordance with the invention is obtained by the improvement of the accuracy of the radial positions, which results of the combination of a two dimensional regular pattern and an absolute code. The increase of the radial accuracy is so made possible thanks to the presence of regular repetitive patterns along the radial axis. This allows the same position estimation technique to be used along the tangential and along the radial direction, in contrast of what is done in the state-of-the-art.

The method and the device in accordance with the invention allow a precision in the determination of the radial position as high as the precision of the determination of the angular position, which can reach a few nanometers.

Another advantage of the invention lies in the possibility to measure how precisely the axis is turning. Because of mechanical imperfections, for example in the ball bearings, the axis does not describe a perfect circle when it rotates. Thus, by fitting a perfect circle on a set of measurements with corrected radial and corrected tangential position, and measuring statistically in what extent the measurements deviate from the fitted circle, the method can estimate the quality of the rotating device.

In addition, these measurements can be repeated over time in order to estimate the wearing of the rotating device. It is possible to trigger an alarm as soon as the rotating device is wearing down too much, that is, as soon as the mean distance from the fitted circle to the measurements points is above a predetermined threshold.

BRIEF DESCRIPTION OF THE DRAWINGS

The invention and its advantages also appear in greater detail from the following description of an embodiment given by way of illustration and with reference to the accompanying figures in which:

FIG. 1 is a schematic illustration of a first embodiment of a device in accordance with the invention, FIG. 2 is a front view of an example of a code-disc of the device of FIG. 1, FIG. 3 is an enlargement of a portion of the code-disc shown in FIG. 2, FIGS. 4 and 5 are schematic illustrations of a code-disc setup that exhibits the eccentricity phenomenon.

DETAILED DESCRIPTION

Figure 6:
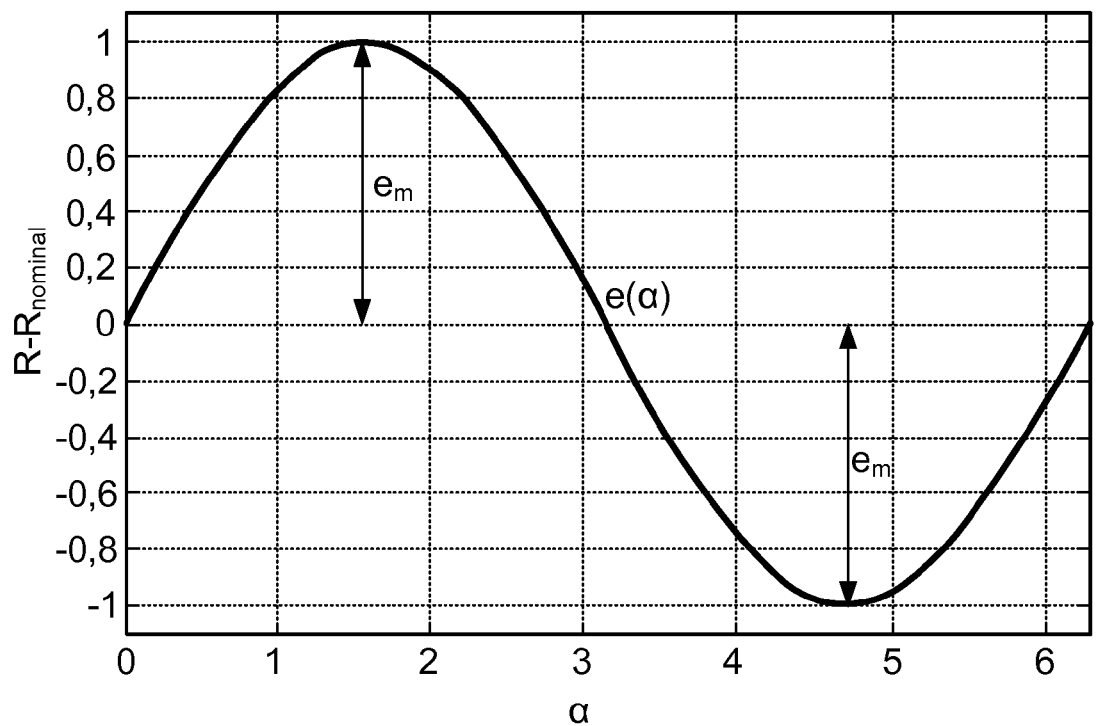
FIG. 6 is an example of a representation of the radial position of a rotating axis in dependence of its angular position.

Elements that are structurally and functionally identical, and that are present in more than one distinct figure or illustration, are given the same numeric or alphanumeric reference in each of them.

FIG. 1 is a schematic illustration of a first embodiment of a device in accordance with the invention. The device for providing an angular position of a rotating element 1 which is able to rotate in a fixed frame, not shown, comprises a fixed light source 2 and a fixed imaging device or sensor 3.

The device comprises also optical transmission means localized on the path of the light beam emitted by the light source 2. The optical transmission means are influencing the light beam in dependence on the angular and the radial position of the rotating element 1.

The fixed sensor 3 is hit by the influenced light beam which is passing through the optical transmission means. In case that the light beam is reflected on the optical transmission means, the sensor 3 has of course to be moved in another position.

The device comprises also processing and computing means for providing the angular position of the rotating element 1 by using the output signal of the sensor 3. The sensor 3 is for instance an imaging device comprising a pixel array.

The optical transmission means comprise an annular code-disc 4 surrounding the rotating element 1 and which is integral in rotation with the rotating element 1. An embodiment of the code-disc 4 is illustrated more in detail in the FIGS. 2 and 3.

The code-disc 4 comprises a two dimensional regular pattern 5 positioned regularly along the radial and along the tangential direction of the code-disc 4 so that the regular pattern 5 extends along an annular area of said code-disc 4.

The optical transmission means comprise also an absolute code interlaced with said two dimensional regular pattern 5. In an embodiment the regular pattern 5 and the absolute code are built up on the code-disc 4 with designed transparent and opaque areas. The transparent areas are for instance made of perforations or holes.

An image of the shadow of the two dimensional regular pattern 5 and of the absolute code is so cast on the sensor 3.

The image which is cast on the sensor 3 has to be understood in the following examples as the shadow of the code-disc 4.

The two dimensional regular pattern 5 extends regularly in the radial and in the tangential direction as shown for instance in FIG. 3. The regular pattern 5 allows a very precise computation of the radial and angular position on the code-disc 4. The precision is given within a period of the regular pattern 5. The absolute code interlacing the regular pattern 5 allows disambiguating this periodicity. The code comprises a set of 0's and 1's interlaced with the regular pattern 5. As an example, small lines, making a 45° angle with the radial direction, represent the 0's and small lines making a −45° angle with the radial directions, represent the 1's.

Any subset of the absolute code in the field of view of the imaging device or sensor 3 must be unique.

The computation of the radial position and of the angular position is made in the same way than the computation of the X and Y positions described in document EP 2 169 357, incorporated by reference, in which an example of a two dimensional regular pattern 5 and an interlacing absolute code are described.

Despite all expectations, the design distortion resulting of the transposition of the two dimensional regular pattern 5 with the interlacing absolute code from a rectangular extension to an annular extension, does not affect the accuracy of the determined values of the radial and angular positions.

The processing and computing means are designed to determine the eccentricity of the code-disc 4, by using for example the detected shadows of the code-disc 4 which are cast on the sensor 3.

The processing and computing means are designed also to compute a corrected angular position of the rotating element 1 with respect to the said eccentricity. The correction is undertaken for each determined angular position of the rotating element 1, by using the value of eccentricity and compensating in an adequate manner the initial (not corrected) determined angular position.

The processing and computing means are designed also to compute a corrected radial position by subtracting the eccentricity from the measured radial position.

The FIGS. 4 and 5 are schematic illustrations of a code disc 4. The code location is depicted by a circle 6, resulting of the two dimensional regular pattern 5 and interlaced absolute code. D represents the center of the code-disc 4 and R is the center of the rotation movement.

In FIG. 4 is shown an eccentricity which equals to e. The positional error on the circle 6 corresponds also to the value e in the configuration shown. For small values of e, the error in the angular position $\epsilon$, equals to the ratio of e and the radius $R_{CD}$:

$$\varepsilon = \frac{\theta}{R_{CD}}$$

As an example, for an eccentricity of e=10 μm, the accuracy of an encoder with 10 mm diameter code disc 4 is limited to 11.6 bits or 400 arcsec. The increase of the accuracy to 20 bits or 1 arcsec, would need a reduction of the eccentricity e to a value as low as 0.03 μm.

FIG. 6 is an example of a representation of the radial position of an image of a code location in dependence on its angular position α.

Due to the eccentricity e(α), in a normalized representation, the axis and the code location follow a sinusoidal variation around a nominal radius $R_{nominal}$, in dependence of the angular position of the code-disc 4. The position of the peaks $e_m$ gives the directions of the maximal eccentricity for one rotation of the code-disc 4.

Figure 7:
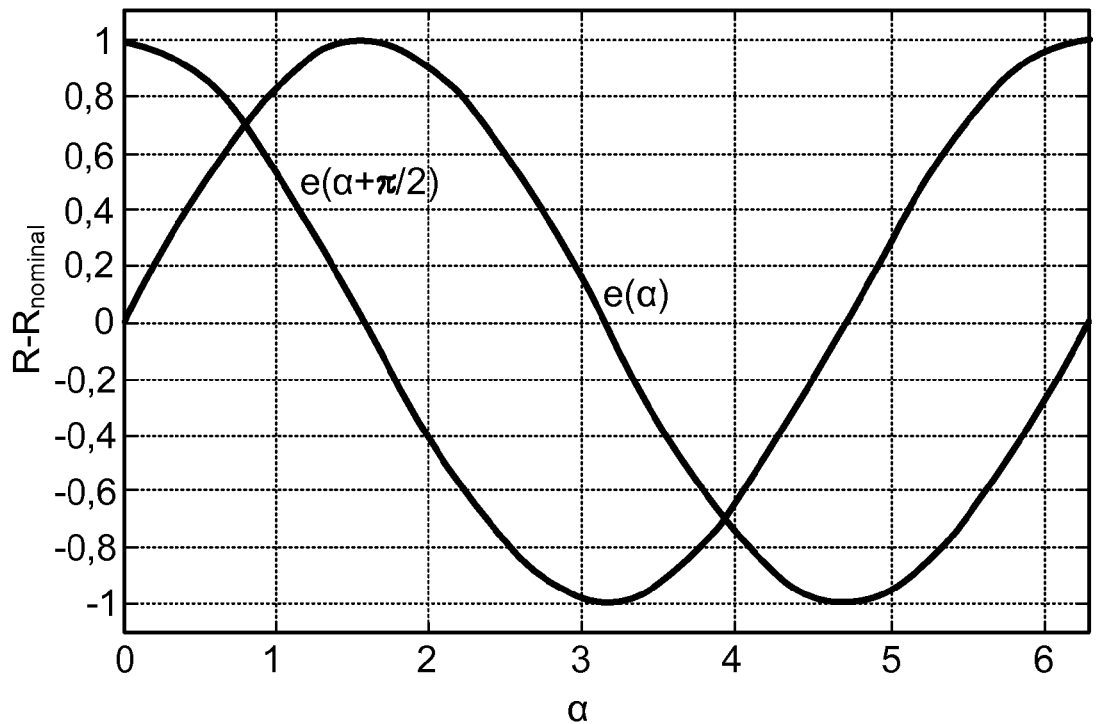
FIG. 7 is an example of a representation of the radial position of a rotating axis associated to a corresponding eccentricity compensation signal in dependence of the angular position of the rotating axis.

FIG. 7 is an example of a representation of the radial position of a rotating axis, more precisely the eccentricity e(α) associated to a corresponding eccentricity compensation signal e(α+π/2), in dependence on the angular position a of the rotating axis. The angle π/2 comes from that fact that a radial error must turn with an angle of π/2 to become a tangential error or angular error on the circle 6

The accurate radial position $P_{accurate}$ of the axis or of any point of the axis corresponds the measured position $P_{measured}$ compensated by the eccentricity compensation signal e(α+π/2). The accurate position $P_{accurate}$ is calculated by subtracting the eccentricity compensation signal e(α+π/2) from the measured position $P_{measured}$:

$$P_{accurate} = P_{measured} - e(\alpha + \pi/2).$$

The method in accordance with the invention can so provide a precise value of an angular position and a radial position of a rotating axis. The precision is made possible by the presence of small repetitive patterns along the radial and along the tangential axis. These positions are obtained by performing the sum of the pixel values along the lines and along the columns of the pixel array. A precise computation of the position is performed using the phase computation method, know from the state-of-the-art, disclosed in document WO2010112082 ([0046] to [0047]), incorporated by reference, and applied separately on each of said sums.

The method in accordance with the invention is carrying out the following steps.

A step a) consists in arranging on the path of the light beam the code-disc 4 which presents the two dimensional regular pattern 5 and the absolute code interlacing the said regular pattern 5 and which is integral in rotation with the rotating element 1.

A step b) consists in using the image casted by regular pattern 5 and the absolute code of the code-disc 4 on the sensor 3, for determining the eccentricity $e(\alpha)$ of the code-disc 4 in dependence of the detected angular position $\alpha$ of the rotating element 1.

A step c) consists in using the eccentricity $e(\alpha)$ for compensating the value of the detected angular position $\alpha$, And finally a step d) consists in computing a corrected angular position $\alpha_{corrected}$ of the rotating element 1.

The described 2D measurement method has the same accuracy in both dimensions, which means in the current context, radial and tangentially. Typically, the resolution is around 5-10 nm for a small sensor, and can be higher for a larger sensor.

The geometrical arrangement favors to diminish the effect of refraction, because the light beam is perpendicular to the code-disc 4. For perfectly perpendicular light beams, there is no deviation of the light beams due to refraction.

In contrary to an end-of-shaft arrangement, the hollow shaft arrangement principle works not only with diverging light beams but also with parallel light beams. For parallel light beams, the measured code-disc 4 position is independent of the X, Y, Z position of the LED/light source 2, as long as the light spot emitted by the LED/light-source 2 entirely covers the sensor. Thanks to this, the measurement is insensitive to vibration of the LED/light-source 2 or slight displacement of LED/light-source 2 due to temperature variations.

In case of the use of a code-disk 4 with holes, the refraction effects are eliminated.

The hollow-shaft encoder has typically higher angular precision and accuracy than an end-of-shaft encoder because its code-disc radius is typically higher. The Angular precision and accuracy are directly proportional with the radius. The resolution $\Omega_{sensor}$ of the sensor 3 is defined as the smallest detectable shadow displacement, which is typically in the order of nanometers. The angular resolution $\Omega_{ang}$ or in other words the smallest detectable angular displacement of a hollow-shaft encoder, shown for instance in FIG. 2, is given by the following equation:

$$\Omega_{ang}=\Omega_{sensor}/R_{CD},$$

where $R_{CD}$ is the radius of the code-disc 4. From this equation, one can conclude that the angular resolution is inversely proportional to the radius of the code-disc 4 and directly proportional to the sensor resolution.

The maximum achievable accuracy with the proposed hollow-shaft encoder is superior compared to the state of the art because the high precision radial position measurement allows very accurate eccentricity compensation of the angular position, so the error due to eccentricity can be for instance 100 times smaller than the corresponding state of the art encoders with the same radius.

Naturally, the present invention can be subjected to numerous variations as to its implementation. Although several embodiments and implementations are described above, it should be understood that it is not conceivable to identify exhaustively all possible variants. It is naturally possible to envisage replacing any of the means described or any of the steps described with equivalent means or an equivalent step without going beyond the scope of the present invention.

What is claimed is:

1. A method for determining at least the eccentricity of a rotating element which is mounted in a fixed frame, said method comprising:
   using at least one fixed light source emitting a light beam in the direction of a fixed sensor;
   arranging the light source with respect to the rotating element and with respect to the sensor in a way so as to induce an interaction between the light beam and the sensor, which depends on the angular position and the radial position of the rotating element;
   using computing and processing means for providing a value of the radial position dependent on the output signal of the sensor;
   arranging on the path of the light beam a code-disc which comprises a two dimensional regular pattern interlaced with an absolute code and which is integral in rotation with the rotating element; and
   using an image cast by said code-disc on the sensor for determining the eccentricity of the code-disc dependent on the angular position of the rotating element.

2. The method of claim 1, wherein the two dimensional regular pattern and the absolute code extend on the code-disc on an annular area.

3. The method of claim 1, further comprising determining the eccentricity by processing for each angular position, a radial spacing between a computed radial position of the image of the code-disc and a detected radial position of the image of the code-disc on the sensor, the computed radial position of the image being the mean value over every angle of the detected radial positions of the image of the code-disc.

4. The method of claim 1, wherein the code-disc surrounds the rotating element and presents transparent and opaque areas defining the two dimensional regular pattern and the absolute code, on an annular area of the said code-disc.

5. A method for determining at least the angular position of a rotating element which is mounted in a fixed frame, said method comprising:
   using at least one fixed light source emitting a light beam in the direction of a fixed sensor;
   arranging the light source with respect to the rotating element and with respect to the sensor in a way so as to induce an interaction between the light beam and the sensor, which depends on the angular position and the radial position of the rotating element;
   using computing and processing means for providing a value of the angular position dependent on the output signal of the sensor;
   arranging on the path of the light beam a code-disc which presents a two dimensional regular pattern interlaced with an absolute code and which is integral in rotation with the rotating element;
   using an image caste by said code-disc on the sensor for determining the eccentricity of the code-disc dependent on the computed angular position of the rotating element;
   using a determined eccentricity value for compensating the value of the computed angular position; and
   computing and providing a corrected angular position of the rotating element.

6. The method of claim 5, wherein the two dimensional regular pattern and the absolute code extend on the code-disc on an annular area.

7. The method of claim 5, further comprising determining the eccentricity by processing for each angular position, a radial spacing between a computed radial position of the image of the code-disc and a detected radial position of the image of the code-disc on the sensor, the computed radial position of the image being the mean value over every angle of the detected radial positions of the image of the code-disc.

8. The method of claim 5, wherein the code-disc surrounds the rotating element and presents transparent and opaque areas defining the two dimensional regular pattern and the absolute code, on an annular area of the said code-disc.

9. The method of claim 1, further comprising providing the angular position of a hollow shaft.

10. The method of claim 1, further comprising providing eccentricity values defining the quality of the roundness of the rotating element.

11. A device for carrying the method according to claim 1 and providing at least the angular position of a rotating element which is able to rotate in a fixed frame, said device comprising a fixed light source emitting a light beam, optical transmission means localized on the path of the light beam and influencing the light beam in dependence on the angular position and the radial position of the rotating element, a fixed sensor which is hit by the influenced light beam and processing and computing means for providing the angular position of the rotating element by using the output signal of the sensor, the optical transmission means comprising an annular code-disc surrounding the rotating element and being integral in rotation with the rotating element, the code-disc comprising a two dimensional regular pattern positioned regularly along the radial and along the tangential direction of the code-disc so that the regular pattern extends along an annular area of said code-disc, the optical transmission means comprising also an absolute code interlaced with said two dimensional regular pattern, and the processing and computing means being designed to determine by using the detected image of the code-disc cast on the sensor, the eccentricity of the code-disc and to compute a corrected angular position of the rotating element with respect to the said eccentricity.

12. The device of claim 11, wherein the regular pattern and the absolute code are built up on the code-disc with transparent and opaque areas, the transparent areas being made of perforations or holes.

13. The device of claim 11, wherein the regular pattern and the absolute code are built up on the code-disc with reflecting areas.

14. The device of claim 11, wherein the sensor is an imaging device comprising a pixel array.

15. The device of claim 11, wherein the processing and computing means are integrated in the sensor.

16. The device of claim 11, wherein the light source is designed for emitting a beam of collimated light with parallel light rays.

17. The device of claim 11, wherein the light source is designed for emitting a light beam with diverging light rays.

18. The device of claim 11, wherein the rotating element is a hollow shaft.

19. The device of claim 11, wherein the rotating element is a ball-bearing or a rotating part supported by ball-bearings.

* * * * *